United States Patent
Strömberg

(10) Patent No.: US 7,152,803 B2
(45) Date of Patent: Dec. 26, 2006

(54) SMART LABEL WEB AND A METHOD FOR ITS MANUFACTURE

(75) Inventor: Samuli Strömberg, Tampere (FI)

(73) Assignee: UPM Rafsec Oy (FI)

( * ) Notice: Subject to any disclaimer, the term of this patent is extended or adjusted under 35 U.S.C. 154(b) by 0 days.

(21) Appl. No.: 10/869,586

(22) Filed: Jun. 16, 2004

(65) Prior Publication Data

US 2005/0087607 A1 Apr. 28, 2005

Related U.S. Application Data

(63) Continuation of application No. PCT/FI02/01044, filed on Dec. 19, 2002.

(30) Foreign Application Priority Data

Dec. 21, 2001 (FI) ................................. 20012549

(51) Int. Cl.
*G06K 19/06* (2006.01)

(52) U.S. Cl. ...................... 235/492; 235/488

(58) Field of Classification Search ................ 235/375, 235/383, 384, 385, 492, 487, 488; 340/5.23, 340/5.24; 365/192

See application file for complete search history.

(56) References Cited

U.S. PATENT DOCUMENTS

| | | |
|---|---|---|
| 3,628,977 A | 12/1971 | Deegan |
| 3,897,964 A | 8/1975 | Oka et al. |
| 4,021,705 A | 5/1977 | Lichtblau |
| 4,253,899 A | 3/1981 | Takemoto et al. |
| 4,288,499 A | 9/1981 | Kielbania, Jr. |
| 4,303,949 A | 12/1981 | Peronnet |
| 4,419,413 A | 12/1983 | Ebihara |
| 4,450,024 A | 5/1984 | Haghiri-Tehrani et al. |
| 4,455,359 A | 6/1984 | Patzold et al. |
| 4,686,152 A | 8/1987 | Matsubayashi et al. |
| 4,841,712 A | 6/1989 | Roou |
| 4,846,922 A | 7/1989 | Benge et al. |
| 4,866,505 A | 9/1989 | Roberts et al. |
| 4,954,814 A | 9/1990 | Benge |
| 5,026,452 A | 6/1991 | Kodai |
| 5,172,461 A | 12/1992 | Pichl |
| 5,201,976 A | 4/1993 | Eastin |
| 5,244,836 A | 9/1993 | Lim |
| 5,250,341 A | 10/1993 | Kobayashi et al. |
| 5,266,355 A | 11/1993 | Wernberg et al. |
| 5,294,290 A | 3/1994 | Reeb |

(Continued)

FOREIGN PATENT DOCUMENTS

DE 19511300 10/1996

(Continued)

*Primary Examiner*—Ahshik Kim
(74) *Attorney, Agent, or Firm*—Fitch, Even, Tabin & Flannery

(57) ABSTRACT

The present invention relates to manufacture of a smart label web, the smart label web comprising smart labels one after another and/or side by side. The smart label web comprises also a circuitry pattern and an integrated circuit on a chip attached to it. In the method, an electric contact is formed between the integrated circuit on the chip and the circuitry pattern on the smart label of the smart label web in such a way that a structural part separated from a separate carrier web and containing the integrated circuit on the chip is electrically connected to the smart label by pressing mechanically. The structural part or the smart label comprises a thermoplastic film whereby the structural part is attached to the smart label substantially entirely.

19 Claims, 2 Drawing Sheets

U.S. PATENT DOCUMENTS

| | | | |
|---|---|---|---|
| 5,302,431 A | 4/1994 | Schultz | |
| 5,309,326 A | 5/1994 | Minoru | |
| 5,337,063 A | 8/1994 | Takahira | |
| 5,384,955 A | 1/1995 | Booth et al. | |
| 5,525,400 A | 6/1996 | Manser et al. | |
| 5,528,222 A | 6/1996 | Moskowitz et al. | |
| 5,598,032 A | 1/1997 | Fidalgo | |
| 5,667,541 A | 9/1997 | Klun et al. | |
| 5,689,263 A | 11/1997 | Dames | |
| 5,690,773 A | 11/1997 | Fidalgo et al. | |
| 5,714,305 A | 2/1998 | Teng et al. | |
| 5,759,683 A | 6/1998 | Boswell | |
| 5,781,110 A | 7/1998 | Habeger, Jr. et al. | |
| 5,810,959 A | 9/1998 | Tanaka et al. | |
| 5,822,194 A | 10/1998 | Horiba et al. | |
| 5,837,367 A | 11/1998 | Ortiz, Jr. et al. | |
| 5,850,690 A | 12/1998 | Launay et al. | |
| 5,852,289 A * | 12/1998 | Masahiko | 235/492 |
| 5,867,102 A | 2/1999 | Souder et al. | |
| 5,918,113 A | 6/1999 | Higashi et al. | |
| 5,918,363 A | 7/1999 | George et al. | |
| 5,920,290 A | 7/1999 | McDonough et al. | |
| 5,932,301 A | 8/1999 | Kamiyama et al. | |
| 5,935,497 A | 8/1999 | Rose | |
| 5,936,847 A | 8/1999 | Kazle | |
| 5,937,512 A | 8/1999 | Lake et al. | |
| 5,952,713 A | 9/1999 | Takahira et al. | |
| 5,962,840 A * | 10/1999 | Haghiri-Tehrani et al. | 235/492 |
| 5,963,134 A * | 10/1999 | Bowers et al. | 340/572.1 |
| 5,969,951 A | 10/1999 | Fischer et al. | |
| 5,973,600 A | 10/1999 | Mosher, Jr. | |
| 5,976,690 A | 11/1999 | Williams et al. | |
| 5,982,284 A | 11/1999 | Baldwin et al. | |
| 5,994,263 A | 11/1999 | Ohshima et al. | |
| 6,025,780 A | 2/2000 | Bowers et al. | |
| 6,040,630 A | 3/2000 | Panchou et al. | |
| 6,066,377 A | 5/2000 | Tonyali et al. | |
| 6,066,378 A | 5/2000 | Morii et al. | |
| 6,070,803 A | 6/2000 | Stobbe | |
| 6,077,382 A | 6/2000 | Watanabe | |
| 6,113,728 A | 9/2000 | Tsukagoshi et al. | |
| 6,147,662 A * | 11/2000 | Grabau et al. | 343/895 |
| 6,161,761 A | 12/2000 | Ghaem et al. | |
| 6,177,859 B1 * | 1/2001 | Tuttle et al. | 340/10.1 |
| 6,204,764 B1 * | 3/2001 | Maloney | 340/568.1 |
| 6,206,292 B1 * | 3/2001 | Robertz et al. | 235/488 |
| 6,220,516 B1 | 4/2001 | Tuttle et al. | |
| 6,232,870 B1 * | 5/2001 | Garber et al. | 340/10.1 |
| 6,248,199 B1 | 6/2001 | Smulson | |
| 6,249,199 B1 | 6/2001 | Liu | |
| 6,259,408 B1 | 7/2001 | Smulson | |
| 6,288,905 B1 | 9/2001 | Chung | |
| 6,293,470 B1 | 9/2001 | Asplund | |
| 6,315,856 B1 | 11/2001 | Asagiri et al. | |
| 6,325,294 B1 | 12/2001 | Tuttle et al. | |
| 6,330,162 B1 | 12/2001 | Sakamoto et al. | |
| 6,353,420 B1 | 3/2002 | Chung | |
| 6,371,378 B1 | 4/2002 | Brunet et al. | |
| 6,376,769 B1 | 4/2002 | Chung | |
| 6,404,643 B1 | 6/2002 | Chung | |
| 6,412,470 B1 | 7/2002 | Ishikawa et al. | |
| 6,412,702 B1 * | 7/2002 | Ishikawa et al. | 235/492 |
| 6,421,013 B1 | 7/2002 | Chung | |
| 6,432,235 B1 * | 8/2002 | Bleckmann et al. | 156/73.1 |
| 6,478,229 B1 * | 11/2002 | Epstein | 235/492 |
| 6,480,110 B1 | 11/2002 | Lee et al. | |
| 6,522,549 B1 | 2/2003 | Kano et al. | |
| 6,540,865 B1 | 4/2003 | Miekka et al. | |
| 6,555,213 B1 | 4/2003 | Koneripalli et al. | |
| 6,557,766 B1 | 5/2003 | Leighton | |
| 6,569,280 B1 | 5/2003 | Mehta et al. | |
| 6,595,426 B1 | 7/2003 | Brunet et al. | |
| 6,600,418 B1 * | 7/2003 | Francis et al. | 340/572.1 |
| 6,736,918 B1 | 5/2004 | Ichikawa et al. | |
| 6,780,668 B1 | 8/2004 | Tsukahara et al. | |
| 6,843,422 B1 | 1/2005 | Jones et al. | |
| 6,853,286 B1 | 2/2005 | Nikawa et al. | |

FOREIGN PATENT DOCUMENTS

| | | |
|---|---|---|
| DE | 19530823 | 2/1997 |
| DE | 19634473 | 1/1998 |
| DE | 19733800 | 2/1999 |
| DE | 19737565 | 3/1999 |
| DE | 19758057 | 5/1999 |
| DE | 19915765 | 10/2000 |
| EP | 0227293 | 7/1987 |
| EP | 0249266 | 12/1987 |
| EP | 0545910 | 6/1993 |
| EP | 0575631 | 12/1993 |
| EP | 0620091 | 10/1994 |
| EP | 0625832 | 11/1994 |
| EP | 0692770 | 1/1996 |
| EP | 0704816 | 4/1996 |
| EP | 0706152 | 4/1996 |
| EP | 0737935 | 10/1996 |
| EP | 0788159 | 8/1997 |
| EP | 0870627 | 10/1998 |
| EP | 0922555 | 6/1999 |
| EP | 0991014 | 4/2000 |
| EP | 1014302 | 6/2000 |
| EP | 1130542 | 9/2001 |
| EP | 1132859 | 9/2001 |
| EP | 1172761 | 1/2002 |
| EP | 1225538 | 7/2002 |
| FI | 20001345 | 12/2001 |
| FI | 20002707 | 6/2002 |
| FR | 2744270 | 8/1997 |
| FR | 2780534 | 12/1999 |
| FR | 2782821 | 3/2003 |
| GB | 2279612 | 1/1995 |
| GB | 2294899 | 5/1996 |
| JP | 61-268416 | 11/1986 |
| JP | 61268416 | 11/1986 |
| JP | 02141094 | 5/1990 |
| JP | 05155191 | 6/1993 |
| JP | 5279841 | 10/1993 |
| JP | 09197965 | 7/1997 |
| JP | 11-221986 | 8/1999 |
| JP | 2000048153 | 2/2000 |
| JP | 2000057287 | 2/2000 |
| JP | 2000113147 | 4/2000 |
| JP | 2000215288 | 8/2000 |
| JP | 2000235635 | 8/2000 |
| JP | 2000242740 | 9/2000 |
| JP | 2001118040 | 4/2001 |
| JP | 2002140672 | 5/2002 |
| WO | WO 9714112 | 4/1997 |
| WO | WO 9844195 | 10/1998 |
| WO | WO 9849652 | 11/1998 |
| WO | WO 9908245 | 2/1999 |
| WO | WO 9924934 | 5/1999 |
| WO | WO 9940760 | 8/1999 |
| WO | WO 9948071 | 9/1999 |
| WO | WO 0045353 | 8/2000 |
| WO | WO 0116878 | 3/2001 |
| WO | WO 0185451 | 11/2001 |
| WO | WO 0249093 | 6/2002 |
| WO | WO 02082368 | 10/2002 |

* cited by examiner

SMART LABEL WEB AND A METHOD FOR ITS MANUFACTURE

This is a continuation of prior International Application No. PCT/FI02/01044 designating the U.S., filed Dec. 19, 2002, which is hereby incorporated herein by reference in its entirety.

The present invention relates to a method for the manufacture of a smart label web, the smart label web comprising smart labels one after another and/or side by side, which comprise a circuitry pattern and an integrated circuit on a chip attached to it, and in which method, an electric contact is formed between the integrated circuit on the chip and the circuitry pattern on the smart label of the smart label web in such a way that a structural part separated from a separate carrier web and containing the integrated circuit on the chip is electrically connected to the smart label by pressing mechanically. The present invention also relates to a smart label web comprising smart labels one after another and/or side by side, which comprise a circuitry pattern and a structural part comprising an integrated circuit on a chip, which is electrically connected to the circuitry pattern by a joint made by mechanical pressing.

BACKGROUND

For attaching an integrated circuit on a chip in such a way that it is in electrical contact with a circuitry pattern, methods are known for direct attachment of the chip by flip-chip technology, or the chip can be attached in such a way that a separate structural part, onto whose surface the chip is attached, is connected to the smart label.

Methods based on flip-chip technology have for example the following disadvantages:

the production line is complicated, expensive and inconvenient in view of further development, because all the operations are integrated on the same line, and the placement of the chip on the smart label requires that the tool used has a long path and also that the chip is positioned very precisely in the correct location.

The smart label can also be provided with a separate structural part comprising an integrated circuit on a chip, attached on a film material. The electrical contact between the integrated circuit on the chip and the circuitry pattern of the smart label is formed so that the film material of the separate structural part comprises a conductive layer which is connected to the chip and which layer is brought into contact with the circuitry pattern in connection with the manufacture of the smart label by connecting both ends of the strip-like structural part to the circuitry pattern, that is, the structural part is off the smart label in the area between its ends. The structural part is attached to that side of the smart label on whose opposite side the circuitry pattern is located so that the chip comes against the smart label.

The above-mentioned methods involve for example the following problems:

In some existing smart labels, the distance between the structural part and the circuitry pattern and simultaneously the distance between the integrated circuit on the chip and the circuitry pattern are changed by bending, because the structural part is not wholly attached to the smart label, wherein the stray capacitance affecting the frequency of the electrical oscillating circuit is changed, and the smart label has a relatively thick construction, which is disadvantageous in further processing steps.

SUMMARY

By means of the method and the smart label web according to the invention, it is possible to reduce the above-mentioned problems. The method of the invention for the manufacture of a smart label web is characterized in that the structural part or the smart label comprises a thermoplastic film whereby the structural part is attached to the smart label substantially entirely. The smart label web according to the invention is characterized in that the structural part or the smart label comprises a thermoplastic film whereby the structural part is attached to the smart label substantially entirely.

The use of thermoplastic films provides e.g. the following advantages:

thermoplastic films can be repeatedly formed by applying heat, the distance between the structural part and the circuitry pattern as well as the distance between the integrated circuit on the chip and the circuitry pattern is fixed, because the structural part is wholly attached to the smart label by the thermoplastic film, wherein the stray capacitance affecting the frequency of the electrical oscillating circuit cannot be changed, and the thermoplastic film isolates the circuitry pattern from the chip, so they can contact each other only at predetermined contact points.

The use of a separate structural part provides e.g. the following advantages:

the process of attachment of the chip is independent of the size and geometry of the circuitry pattern, the picking up of a chip from a wafer and its placement on a carrier web is a simple and fast process, because only a short path is required of the turning tool, as the structural part is small in size, it can contain materials which are more expensive but have better properties, such as more thermoresistant materials or materials with better dimension stability, and the attachment of the structural part to the smart label can be made with greater tolerances than the direct attachment of the chip to the circuitry pattern of the smart label.

The method according to the invention provides e.g. the following advantages:

efficient and reliable production, sufficient reliability and strength of the product, minimum fixed and variable costs per smart label web, flexible production technology, and remaining development potential.

In the present application, smart labels refer to labels comprising an RF-ID circuit (identification) or an RF-EAS circuit (electronic article surveillance). A smart label web consists of a sequence of successive and/or adjacent smart labels. The circuitry pattern can be manufactured by pressing the circuitry pattern with an electroconductive printing ink on a film, by etching the circuitry pattern on a metal film, by punching the circuitry pattern from a metal film, or by winding the circuitry pattern of for example copper wire. Typically the circuitry pattern is formed by etching it on the metal film. The electrically operating RFID (radio frequency identification) circuit of the smart label is a simple electric oscillating circuit (RCL circuit) operating at a determined frequency. The circuit consists of a coil, a capacitor and an integrated circuit on a chip. The integrated circuit comprises an escort memory and an RF part which is arranged to communicate with a reader device. Also the capacitor of the RCL circuit can be integrated in the chip or it can be located outside the chip. When the capacitor is located outside the chip, it is formed by plates on the smart label web and the structural part. The plates are located one upon the other thereby forming the capacitor in a ready smart label.

The smart label web is of a material that is flexible but still has a suitable rigidity, such as polycarbonate, polyolefine, polyester, polyethylene terephtalate (PET), polyvinyl chloride (PVC), or acrylonitrile/butadiene/styrene copolymer (ABS).

In the method according to the invention, a carrier web comprising a base web is first manufactured. The base web can be of the same material as the smart label web but the choice of the material depends for example on the embodiment of the invention to be applied. The surface of the base web is provided with a conductive metal coating for electrical contacts of structural parts.

The wafer is normally supplied for use in attaching processes so that the chips are separated from each other, on a carrying film supported by a frame. The single chips are detached in the process by pushing the chip mechanically from underneath the carrying film and by gripping the chip from the opposite side with a die bonder or die sorter utilizing an underpressure suction.

Integrated circuits on chips are attached one after another and/or next to each other on the surface of the base web by using flip-chip technology. The chips are picked up from the silicon wafer by means of a die sorter and placed in a continuous manner onto the surface of the base web. Possible techniques to attach the chip to the base web include technologies known as such, such as placing a chip by a die sorter on a piece of a blister tape attached to the smart label. The chip can also be placed in a recess formed in the base web. Then contact pads of the chip are in the level of the upper surface of the base web or they are formed at the ends of the chip. The other way to put a chip into a recess is to put it so that the active side of the chip is on the upper level of the chip. The chip is in two previous cases relatively thin, at the most 70 m, typically 50–70 m. Because the dimensions of the structural part to be formed of the carrier web are small, it is possible to place chips relatively close to each other on the carrier web, and thereby long paths will not be needed for attaching the chip. With short paths, it is possible to implement sufficiently accurate positioning more easily than on attachment of the chip directly to the circuitry pattern. Furthermore, the position of the chip on the structural part may vary within a larger range.

A thermoplastic film is attached to that side of the base web which has the conductive metal coatings for electrical contacts of the structural parts and the chip. The thermoplastic film is formed on the base web by lamination or extrusion. The thermoplastic film may include a two layer structure in which the outer layer of the thermoplastic film melts or softens at a lower temperature than the inner layer of the thermoplastic film. The inner layer remains unchanged and keeps its thickness while the outer layer adheres to the smart label when the thermoplastic film is heated to a suitable temperature. Thus the capacitance of the capacitor formed by plates on the smart label and the structural part remains constant. The two layer structure is achieved by co-extrusion or lamination. Films that can be heat-sealed, for example polyolefines or polyurethane, or hot melt adhesives can be laminated on the base web. Extruded films are formed on the base web in a molten state. Suitable materials to be extruded are for example polyethyleneterephtalate (PET), polyolefines (PE, PP), polyvinylchloride (PVC), polycarbonate (PC) or acrylonitrile/butadiene/styrene copolymer (ABS).

In the next step, structural parts comprising an integrated circuit on a chip are separated from a carrier web, and the structural parts are attached to the circuitry pattern of a smart label in a web containing smart labels. The structural part is preferably attached to that side of the smart label, on which the circuitry pattern is provided, although attachment to the reverse side is also possible. The attachment is made so that the structural part is attached by applying heat and pressure to each smart label on the smart label web in such a way that the thermoplastic film is in contact with the smart label and the side of the base web is left as the outer surface of the structural part. The structural part is substantially fully attached to the smart label, wherein a reliable bond is achieved. The structural part can be attached first slightly to the smart label by using heat to melt or soften the thermoplastic film. The final bond can be made in a nip, in a series of nips or in some other arrangement capable of producing pressure and/or heat.

The electrical contact between the circuitry pattern and the integrated circuit on the chip is achieved by a joint made by mechanical pressing. The term mechanical pressing means that the joint is made by applying pressure to get a physical contact between the counterparts or the counterparts are so close to each other that an electrical contact between them is possible. At least one end of the structural part is attached to the smart label by applying pressure, the other end can make an electrical contact through a capacitor formed by plates on the smart label and the structural part which are aligned one upon the other in the ready smart label. The manufacture of the carrier web and the manufacture of the smart label web can take place in the same process or in separate processes.

BRIEF DESCRIPTION OF THE DRAWINGS

In the following, the invention will be described with reference to the appended drawings, in which.

DETAILED DESCRIPTION

Figure 1C:
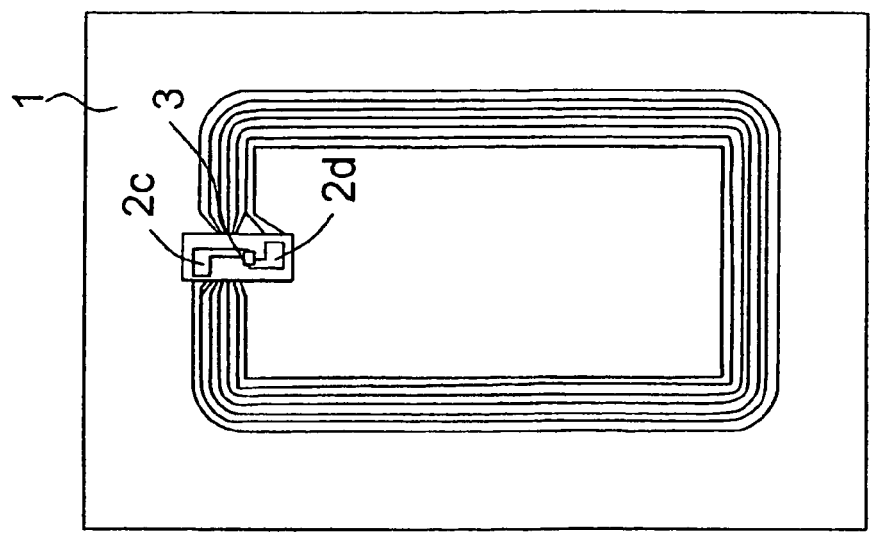
FIG. 1c shows a ready smart label according to the invention in a top view.
Figure 1B:
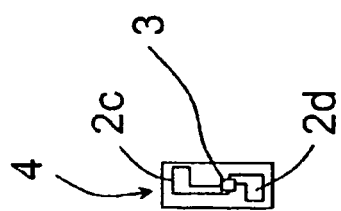
FIG. 1b shows a structural part in a top view.
Figure 1A:
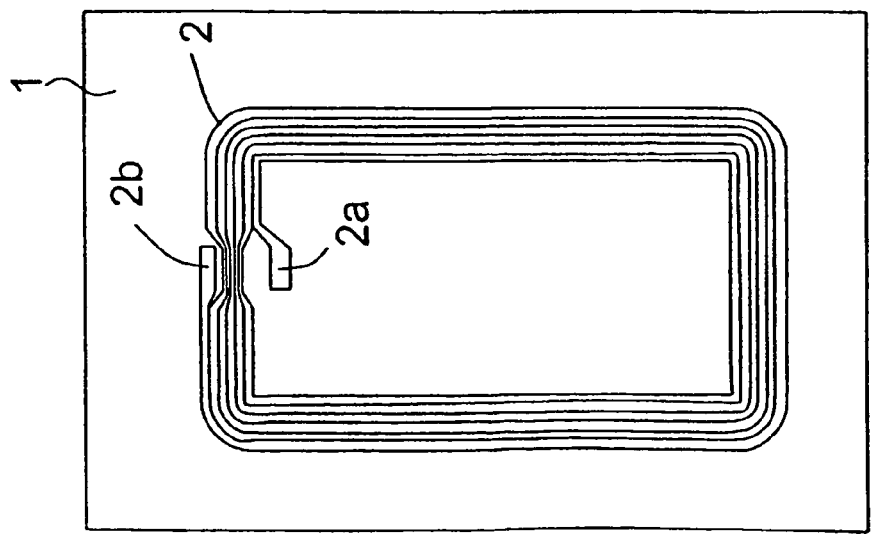
FIG. 1a shows a circuitry pattern of a smart label in a top view.

FIG. 1a shows a circuitry pattern 2 of a smart label 1. During processing, smart labels are in a web form, the web comprising successive and/or adjacent smart labels. The ends of the circuitry pattern are indicated with reference numbers 2a and 2b.

FIG. 1b shows a structural part 4. The structural part 4 comprises a base web 4b, an integrated circuit 3 on a chip and a thermoplastic film 4a, attached to the surface of the base web (shown in FIG. 2). The contact points made of conductive material are indicated with reference numbers 2c and 2d.

FIG. 1c shows a smart label 1 comprising a circuitry pattern 2 and an integrated circuit 3 on a chip, attached to the surface of a separate structural part 4. An electrical contact is formed between the circuitry pattern 2 and the integrated circuit 3 on the chip by aligning points 2b and 2c in one end of the structural part and points 2a and 2d in the other end of the structural part. The joint is made by mechanical pressing from at least one end of the structural part. The structural part 4 is attached to the smart label 1 in such a way that substantially the whole area of its one side is attached to the smart label 1 by means of a thermoplastic film. The integrated circuit on the chip 3 is left between the base web 4b and the thermoplastic film 4a. The structural part 4 and/or the circuitry pattern 2 of the smart label can be provided with bumps for providing an electrical contact. The bumps can be provided before the lamination or the extrusion of the thermoplastic film on the same production line on which the chip is attached to the base web in such a way that suitable bumps, whose material can be a suitable metal, are formed at the ends of the structural part 4. So-called stud bumps can be formed at this process step by means of a gold wire bonder but they are not essential.

Figure 2:
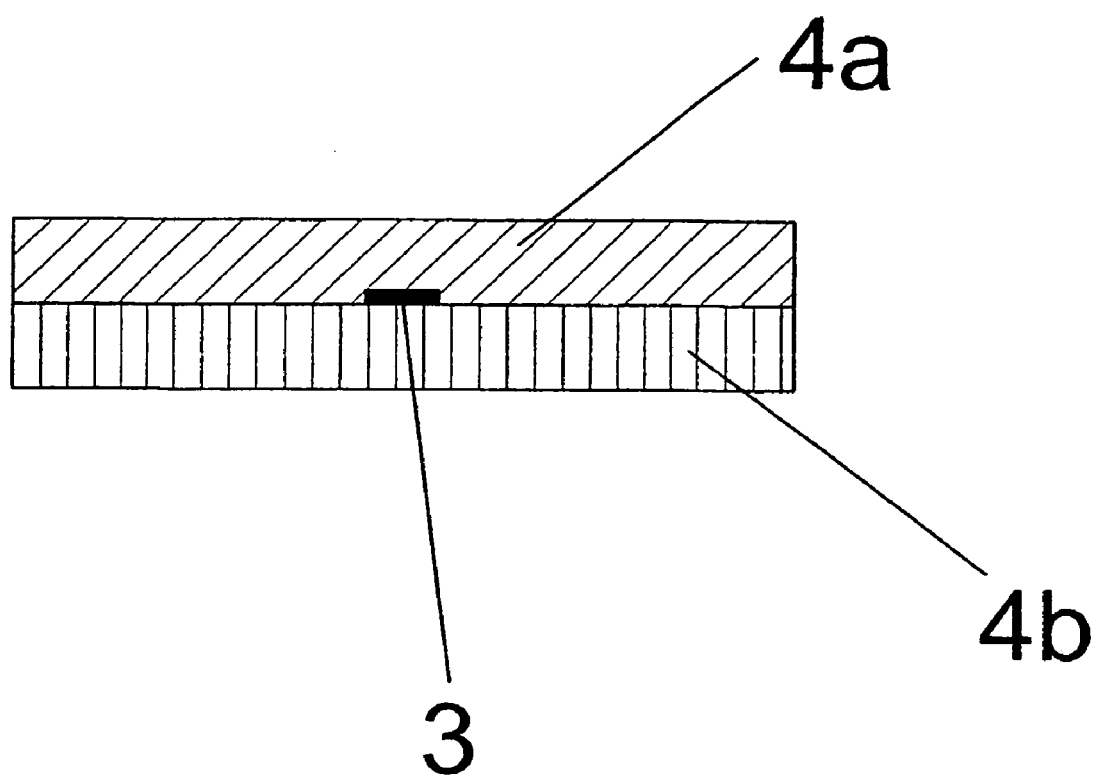
FIG. 2 illustrates the structure of the structural part in a cross-section.

FIG. 2 shows the cross-section of the structural part 4. The structural part comprises an integrated circuit on a chip 3, a thermoplastic film 4a, and a layer 4b consisting of the base web. On the surface where the thermoplastic film 4a is attached, the layer 4b is provided with the conductive metal coating of the structural part.

The above-described facts do not restrict the invention, but the invention may vary within the scope of the claims. The manufacture of the carrier web and the manufacture of the smart label web can take place in the same process or they can be separate processes. The process of manufacture of the smart label web can be continued so that the other layers to be joined to the surface of the smart label web are attached in the same process, even so that the attachment is made simultaneously with the final bond of the structural part. The thermoplastic film can also be on the smart label and its size is at least as large as that of the structural part but the thermoplastic film can also cover the whole smart label thus at the same time protecting the smart label. The main idea of the present invention is that a separate structural part comprising an integrated circuit on a chip can be attached to a smart label substantially entirely by using a thermoplastic film. Thus problems occurred due to the changing stray capacitance can be avoided.

What is claimed is:

1. A method for the manufacture of a smart label web, comprising:
    providing a structural part comprising a base layer and a thermoplastic film attached to each other, the structural part having two ends and comprising an integrated circuit on a chip between the ends, the ends of the structural part and the integrated circuit being in electrical contact with each other;
    providing a smart label web base having a circuitry pattern thereon;
    forming an electric contact between the integrated circuit on the chip and the circuitry pattern by connecting electrically the ends of the structural part to the contact points of the circuitry pattern in such a manner that at least one end is connected by pressing mechanically; and
    attaching the structural part to the smart label web base substantially entirely by the thermoplastic film.

2. The method according to claim 1 wherein the thermoplastic film is on the surface of the base layer.

3. The method according to claim 2 wherein the thermoplastic film on the surface of the base layer comprises a plurality of layers of thermoplastic film.

4. The method according to claim 3 wherein a first layer of thermoplastic film is on the base layer and a second layer of thermoplastic film is on the first layer of thermoplastic film and the second layer melts at a temperature lower than does the first layer.

5. The method according to claim 4 wherein the electrical connection between the structural part and the circuitry pattern on the smart label web comprises a capacitive connection and the thermoplastic film is between conductors which form capacitor plates.

6. The method according to claim 1 wherein the structural part is small with respect to the smart label web base.

7. The method according to claim 1 wherein the electrical connection between the structural part and the circuitry pattern on the smart label web comprises a capacitive connection.

8. The smart label web according to claim 1 wherein the electrical connection between the structural part and the circuitry pattern on the smart label web comprises a capacitive connection.

9. A method for the manufacture of a smart label web, comprising:
    providing a structural part comprising a base layer, the structural part having two ends and comprising an integrated circuit on a chip between the ends, the ends of the structural part and the integrated circuit being in electrical contact with each other,
    providing a smart label web base having a circuitry pattern thereon;
    covering the smart label web base at least partially by a thermoplastic film;
    forming an electric contact between the integrated circuit on the chip and the circuitry pattern by connecting electrically the ends of the structural part to the contact points of the circuitry pattern in such a manner that at least one end is connected by pressing mechanically; and
    attaching the structural part to the smart label web base substantially entirely by the thermoplastic film.

10. The method according to claim 9 wherein the thermoplastic film comprises a plurality of layers of thermoplastic film.

11. The method according to claim 10 wherein a first layer of thermoplastic film interfaces with the structural part and a second layer of thermoplastic film is between the first layer of thermoplastic film and smart label web base, and the second layer melts at a temperature lower than does the first layer.

12. The method according to claim 11 wherein the structural part is small relative to the smart label web base.

13. The method according to claim 12 wherein the electrical connection between the structural part and the circuitry pattern on the smart label web comprises a capacitive connection.

14. The method according to claim 11 wherein the electrical connection between the structural part and the circuitry pattern on the smart label web comprises a capacitive connection and the thermoplastic film is between conductors which form capacitor plates.

15. A smart label web comprising a plurality of smart labels, the smart label web comprising a smart label web base comprising smart label blanks and a plurality of structural parts, each smart label comprising a circuitry pattern and a structural part comprising a base layer having two ends and comprising an integrated circuit on a chip between the ends, the ends of the structural part and the integrated circuit on the chip being in electrical contact with each other, the integrated circuit on the chip being electrically connected to the circuitry pattern through the ends of the structural part in such a manner that at least one end is connected by a joint made by mechanical pressing, the structural part being attached to the smart label blank substantially entirely by a thermoplastic film.

16. The smart label web according to claim 15 wherein the thermoplastic film is between the base layer of the structural part and the smart label blank, and the thermoplastic film comprises a plurality of layers.

17. The smart label web according to claim 16 wherein a first layer of thermoplastic film interfaces with the base layer of the structural part and a second layer of thermoplastic film is between the first layer of thermoplastic film and the smart label blank, and the second layer melts at a temperature lower than does the first layer of thermoplastic film.

18. The smart label web according to claim 17 wherein the structural part is small relative to the smart label blank.

19. The smart label web according to claim 17 wherein the electrical connection between the structural part and the circuitry pattern on the smart label web comprises a capacitive connection and the thermoplastic film is between conductors which form capacitor plates.

* * * * *